United States Patent [19]

Sinnema

[11] 4,265,354
[45] May 5, 1981

[54] APPARATUS FOR POSITIONING PRISMATIC BRICKS UPON A LONGITUDINAL SMALL SIDE, SYMMETRICALLY WITH RESPECT TO EACH OTHER

[75] Inventor: Hendrik Sinnema, Sneek, Netherlands

[73] Assignee: Machinefabriek W. Hubert & Co. B.V., Sneek, Netherlands

[21] Appl. No.: 939,659

[22] Filed: Sep. 5, 1978

[30] Foreign Application Priority Data

Sep. 5, 1977 [NL] Netherlands .......................... 7709762

[51] Int. Cl.² .............................................. B65G 47/24
[52] U.S. Cl. .................................... 198/374; 198/406; 198/420; 198/424
[58] Field of Search ............... 198/374, 406, 416, 420, 198/424, 429; 193/47; 414/55, 754, 780, 781

[56] References Cited

U.S. PATENT DOCUMENTS 2,840,220  6/1958  Antonelli .............................. 198/406

FOREIGN PATENT DOCUMENTS 2110857  6/1972  France .
7407487  12/1975  Netherlands .

*Primary Examiner*—Jeffrey V. Nase
*Attorney, Agent, or Firm*—Wilkinson, Mawhinney & Theibault

[57] ABSTRACT

Apparatus for positioning prismatic bricks comprising a supporting face for bricks which are supplied pairwise parallel to each other and resting upon one of the large surfaces, and a pusher member above said supporting surface, pushing them from an edge thereof and with at least one pair of longitudinal supporting members protruding from said edge in the direction of travel of the bricks and excentrical with respect to the center lines of the paths of travel.

5 Claims, 3 Drawing Figures

U.S. Patent    May 5, 1981    4,265,354
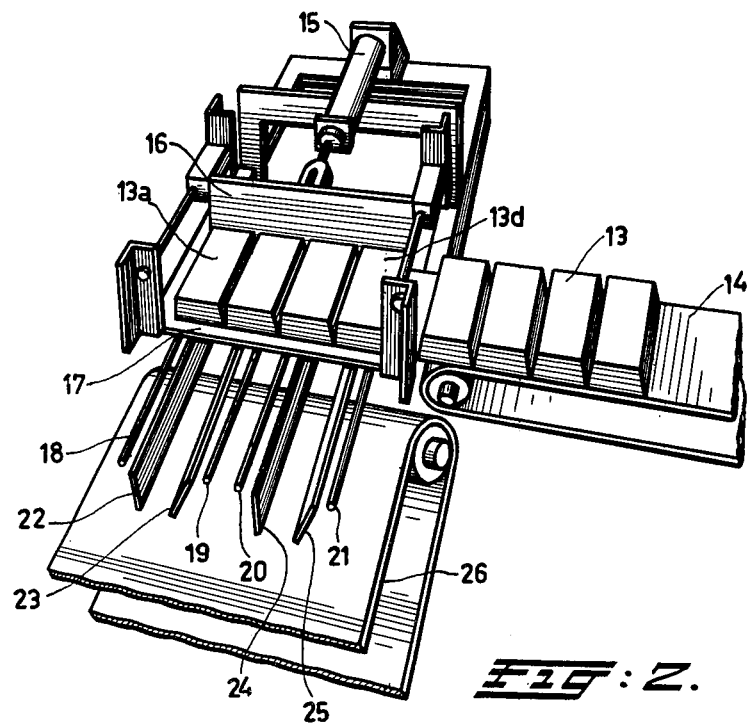
FIG: 2.
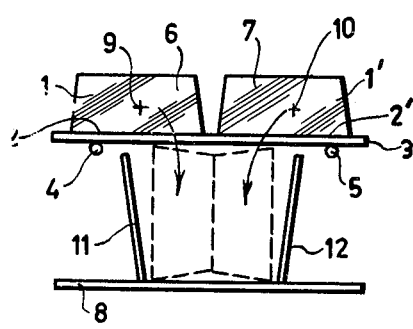
FIG: 2a.
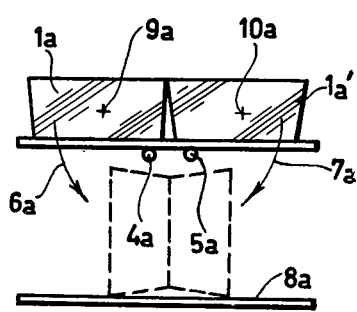
FIG: 2b.

APPARATUS FOR POSITIONING PRISMATIC BRICKS UPON A LONGITUDINAL SMALL SIDE, SYMMETRICALLY WITH RESPECT TO EACH OTHER

TECHNICAL FIELD

The invention relates to an apparatus for positioning prismatic bricks symmetrically with respect to each other, upon a longitudinal small side, the smallest of the large surfaces facing each other.

Of many bricks, in particular handformed bricks, one of the large surfaces is somewhat smaller than the other one, resulting in their cross sections being parallelogram-shaped. So as to provide a stable stack of a number of the said bricks they are preferably placed pairwise upon a longitudinal small side whereby the smallest of the large surfaces rests against each other; the bricks of each pair then tend to tilt towards each other, improving the stability within the said brick.

Positioning said bricks in a manner as described hereinbefore was performed up till now by hand.

The present invention provides an apparatus for mechanically performing said operation.

DISCLOSURE OF INVENTION

An apparatus in accordance with the present invention comprises a supporting face for supporting at least one pair of bricks which are supplied lying parallel to each other, each resting upon one of the large surfaces with a pusher member being mounted above said supporting surface, engaging the bricks and pushing them towards and from an edge of said face, and with at least one pair of longitudinal supporting members protruding from the said edge in the direction of travel of the bricks and being positioned excentrical with respect to the center lines of the paths of the bricks and with a receptacle situated therebelow.

When the pusher member pushes the bricks towards the edge of the supporting face said bricks will initially bear upon both the supporting face and on the respective supporting members. Owing to the excentrical position of the supporting members the bricks will tilt about said supporting members causing them to land upon the receiving face of the receptacle in the desired position, e.g. resting pairwise against each other.

The supporting members are preferably positioned on either side outside the center lines of the directions of travel and the bricks are supplied resting upon the largest surfaces. Each pair of members is further preferably combined with a pair of downwardly directed converging guide members.

In a preferred embodiment the receiving face (receptacle) is formed by the surface of a discharge conveyor, whereas the supporting face is formed by the surface of a supply conveyor.

BRIEF DESCRIPTION OF THE DRAWINGS

The invention will now be illustrated with respect to the drawing, wherein:

FIGS. 1a and 1b are schematic front views, with respect to which the inventive conception of the present invention will be clarified;

FIG. 2 is a perspective view of an embodiment based upon the inventive conception as clarified in FIG. 1.

BEST MODE FOR CARRYING OUT THE INVENTION

FIG. 1a shows the front of two bricks 1, 1' which have a parallelogram-shaped cross section, as shown in the said figure. Their largest surface 2, 2' bears upon a supporting table 3; two longitudinal supporting members 4, 5 projecting from the front edge of said supporting table.

When a suitable pusher member pushes the bricks 1, 1' in a direction perpendicular to the plane of the drawing, towards the edge of the supporting table 3, the bricks will initially still be supported by the members 4, 5 and the surface of the table 3. When, however, the rear edge of the bricks has reached the edge of the supporting table 3 the bricks will tilt towards each other in the direction of the arrows 6, 7. The bricks will then be in the position as shown in FIG. 1a in discontinuous lines upon the surface 8, which is the position desired for stacking them. The smallest of the large surfaces of the bricks will rest against each other, so that they obtain a stable position. The fact that the members 4, 5 are placed excentrically with respect to and outside the center lines 9, 10 of the paths of the bricks causes the tilting movement. From this it follows that the configuration as illustrated in FIG. 1b can be used as well. The embodiment as shown in FIG. 1a presents, however, the advantage that it is possible to mount guide plates 11, 12 below the members 4, 5, the mutual position of which is adaptable and adjustable to the contours of the bricks to be processed.

FIG. 2 illustrates an embodiment of the apparatus in accordance with the invention wherein two pairs of bricks are tilted together. The bricks are supplied in a row 13 upon the supply conveyor 14; four bricks 13a to 13d inclusive are mutually pressed from the supporting table 17 by means of a pusher plate 16 driven by an air cylinder 15, the bricks resting upon the members 18, 19, 20 and 21.

Below said members the guide plates 22, 23, 24 and 25 are mounted, the mutual distance of which is adjustable by means of a mechanism (not shown). Below the guide plates there is a discharge conveyor 26 which can be driven intermittently. When the bricks 13a–13d inclusive are pushed from the supporting table 17 by means of the pusher plate 16, said bricks will tilt in the manner as shown in FIG. 1a upon the discharge conveyor 26, which will discharge said bricks.

It goes without saying that the motions of the supply conveyor 14, the pusher plates 16 and the discharge conveyor 26 are synchronized by means of a suitable drive mechanism.

What I claim is:

1. Apparatus for pairwise positioning prismatic bricks symmetrically with respect to each other, upon a longitudinal small side, said bricks having a pair of large surfaces, the smallest of the large surfaces facing each other, comprising a supporting face for supporting at least one pair of said bricks which are supplied lying parallel to each other, each resting upon one of the large surfaces, a pusher member being mounted above said supporting face, engaging the bricks and pushing them towards and from an edge of said supporting face, at least one pair of longitudinal supporting members protruding from said edge in the direction of travel of the bricks and being positioned excentrical with respect to the center lines of the paths of the bricks, and a supporting surface therebelow wherin the pair of bricks will rotate about said supporting members so that the smallest of the large surfaces of said bricks are facing each other on said supporting surface.

2. An apparatus as claimed in claim 1, characterized in that the supporting members are positioned on either side outside the center lines of the direction of travel and the bricks are supplied resting upon the largest surfaces.

3. An apparatus as claimed in claim 2, characterized by at least one pair of downwardly directed converging guide members.

4. An apparatus as claimed in claims 1, 2 or 3, characterized in that the supporting surface is formed by a discharge conveyor.

5. An apparatus as claimed in claims 1, 2 or 3, characterized in that the supporting face can receive two or more pairs of bricks and cooperates with two or more pairs of supporting members.

* * * * *